T. H. B. MOREHOUSE.
Improvement in Bed Bottoms.
No. 122,048. Patented Dec. 19, 1871.
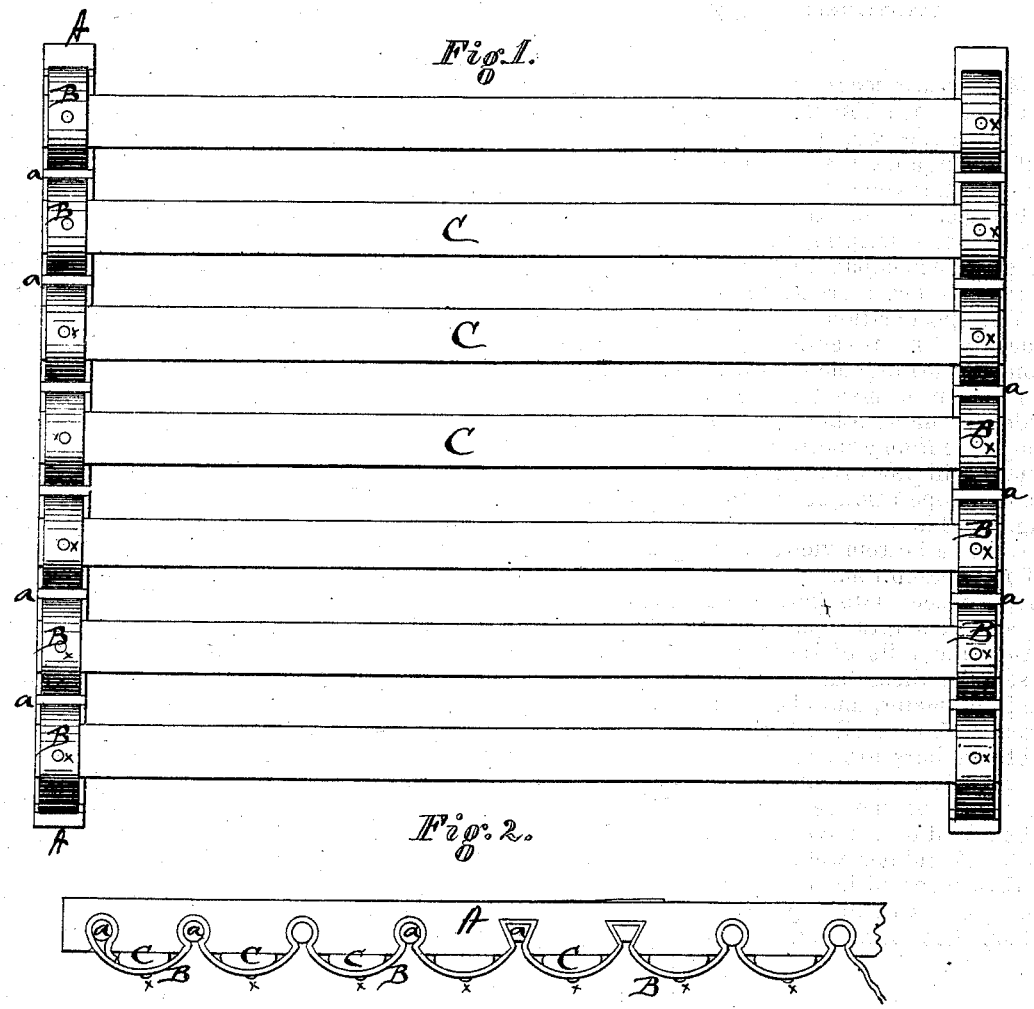
Witnesses:
Henry N. Miller
C. L. Evert
Inventor
Thomas H. B. Morehouse
per Alexander F. Mason
Attorneys.

UNITED STATES PATENT OFFICE.

THOMAS H. B. MOREHOUSE, OF LANSING, MICHIGAN.

IMPROVEMENT IN BED-BOTTOMS.

Specification forming part of Letters Patent No. 122,048, dated December 19, 1871.

*To all whom it may concern:*

Be it known that I, THOMAS H. B. MOREHOUSE, of Lansing, in the county of Ingham and in the State of Michigan, have invented certain new and useful Improvements in Bed-Bottom; and do hereby declare that the following is a full, clear, and exact description thereof, reference being had to the accompanying drawing and to the letters of reference marked thereon making a part of this specification.

The nature of my invention consists in the construction and arrangement of a bed-bottom, as will be hereinafter more fully set forth.

In order to enable others skilled in the art to which my invention appertains to make and use the same, I will now proceed to describe its construction and operation, referring to the annexed drawing, in which—

Figure 1 is a bottom view, and Fig. 2 an end view of my bed-bottom.

A A represent two bars about two inches square, and in length equal to the distance between the side rails of the bedstead. On the under sides of these bars are bored holes half an inch in diameter, and about one-eighth of an inch from the lower edge. Through the lower edges of the bars are then cut slots into said holes. The number of these slots depends upon the width of the bed, and the holes may either be round or of dovetailed shape, as shown in Fig. 2. A rubber web, B, the width of the bar, is then inserted in one of said slots, forming a loop, and a wooden pin, $a$, is then driven in the loop thus formed, said pin being of sufficient size to tightly press the web and prevent it from sliding. The web is then passed along on the under side of the bar to the next slot, and so on for the entire width of the bed. A slat, C, is then placed in each space between the web and the bar which forms the bottom. It will be seen that the slats are each laid flat in the spaces between the webbing, and are there secured by a screw or small nail, $x$, to keep them from turning in their places, which would otherwise occur if the slats were tenoned at their ends and not thus held in place. To protect the web B from rubbing or wearing at the edges of the slots, I may, previous to the insertion of the web, place in each slot a piece of leather, of sufficient length to reach in the bottom of the slot, and extend along the under side of the bar for about half an inch on each side of the slot.

Having thus fully described my invention, what I claim as new, and desire to secure by Letters Patent, is—

The within-described bed-bottom, composed of the end pieces A A, the slats C C, and the rubber webbing B B, secured by the grooves and pins $a$, and the slats nailed or screwed to the webbing by the nails or pins $x$ $x$, all as shown and described.

In testimony that I claim the foregoing I have hereunto set my hand this 26th day of September, 1871.

T. H. B. MOREHOUSE.

Witnesses:
GEO. G. LAPHAM,
W. RICHTER.

(62)